Feb. 1, 1955
RAMON DAURA ROURE
2,700,874
APPARATUS TO PRODUCE ELECTRICAL ENERGY
BY MEANS OF THE FORCE OF THE SEA
Filed Nov. 21, 1951
3 Sheets-Sheet 1
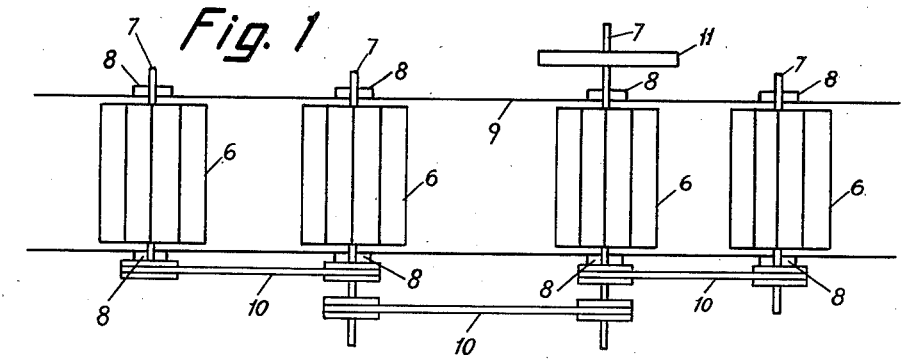
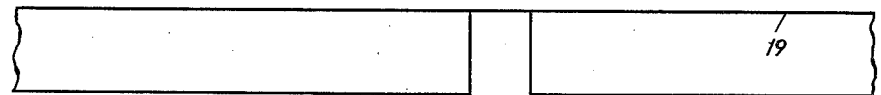
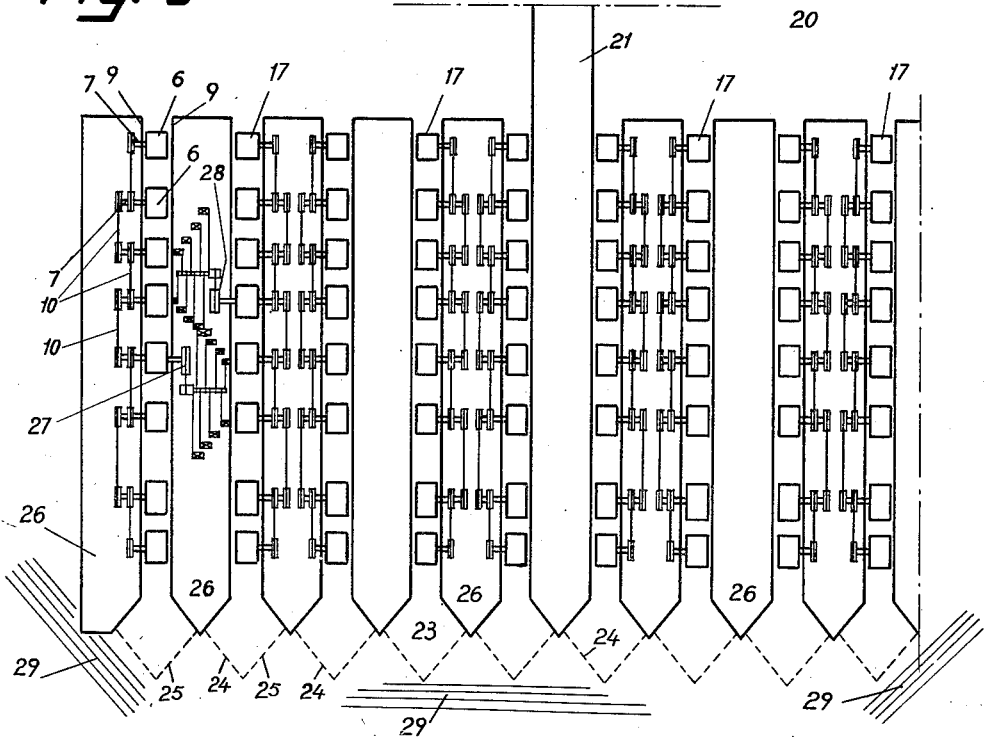
INVENTOR.
Ramon Daura Roure
BY
Henderoth, Lind & Ponack
Attorneys.

Feb. 1, 1955 RAMON DAURA ROURE 2,700,874
APPARATUS TO PRODUCE ELECTRICAL ENERGY
BY MEANS OF THE FORCE OF THE SEA
Filed Nov. 21, 1951 3 Sheets-Sheet 2
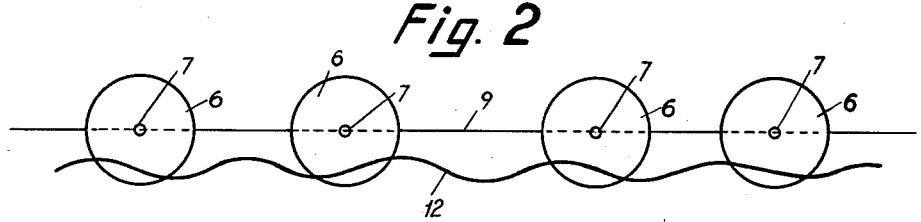
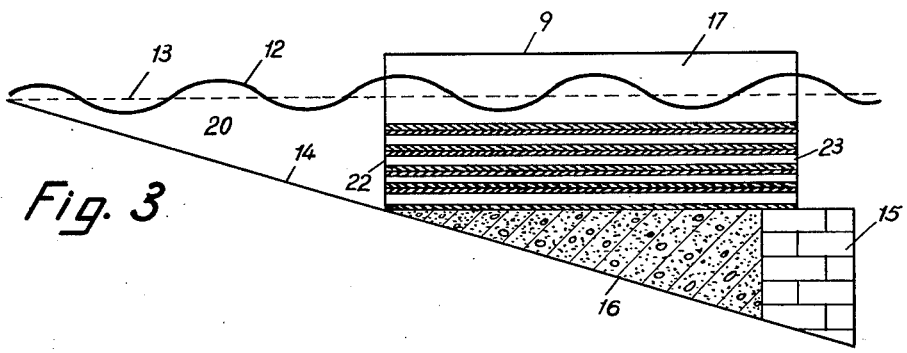
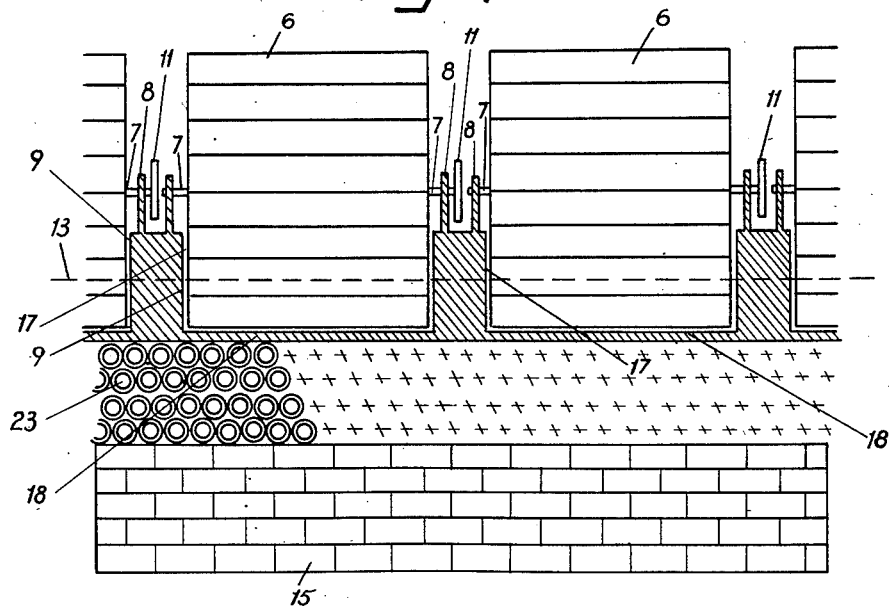

United States Patent Office 2,700,874
Patented Feb. 1, 1955

2,700,874

APPARATUS TO PRODUCE ELECTRICAL ENERGY BY MEANS OF THE FORCE OF THE SEA

Ramón Daura Roure, Barcelona, Spain

Application November 21, 1951, Serial No. 257,454

Claims priority, application Spain February 20, 1951

3 Claims. (Cl. 61—20)

The present invention relates to a system, including the apparatus and devices relevant to produce electrical energy by means of the force of the sea.

The numerous intents realized in order to utilize the energy evolved by the forces of nature, especially by the agitation of the sea, have produced no satisfactory result hitherto, owing to the irregularity of the attained working which annulled the continuity of effort necessary to make possible the transformation thereof into electrical energy.

The present invention solves said difficulty in a simple and efficacious way, allowing to dispose in every moment of a source of mechanical energy which, on being transformed into electrical energy, is able to supply an incalculable number of kilowatts, since also the mechanical yield thereof is extensive, either due to the amplitude of an installation, or on account of the possibility to multiply the same, said production being always a matter of importance.

The basis of the present invention is to provide a series of wheels, of the water-driven mill wheels type, stepped in depth at irregular distances, that is to say that along a natural or artificial duct or channel into which penetrate the waves or undulations of the sea are located said wheels with the horizontal axles thereof and that the same are linked together by means of any device of mechanical linking union, thus being forced that the movement of any one of them reacts upon all the others causing them to rotate in the same direction and at the same velocity.

The essential feature of the present invention is that the distances between axles are irregular, thus being avoided the possibility that an undulatory uniformity of the surface of the sea may coincide with another special uniformity of axles, whereby would arise moments in which all the wheels of the series would result impelled, whereas on the contrary in other moments would be none. If we arrange them with special irregularity, there will be, at least, always one wheel actuated and, consequently, there will be not a sole moment in which the system would not be driven, since as we have mentioned, any wheel which rotates causes to rotate the remaining ones of the series which the same forms a part of.

Each series of wheels arranged in this way furnishes an axle which may be the prolongation of any one of the wheels of said series with rotatory movement, and on this axle is mounted the wheel which we may call the driving wheel of the system, since from the same start the transmitting means for operating the machines which convert the mechanical energy into electrical energy, interposing in case of need between one and the others speed multiplying or reducing devices.

The mounting of each wheel on the respective axle thereof is performed in such a way that said wheel becomes dependent upon its axle when the same rotates in one direction, but that it becomes independent thereon in contrary rotation, in order that thus the rotation of the axle may not be affected by the motions of return flow in case that these exist at the place of location; such a result may be attained, for instance, with a free-wheel device. It is obvious that said rotation in contrary direction of a wheel does not involve loss of time, since in that moment there will be another wheel of the series affected by impulsion which we may call positive.

In order to prevent the prejudicial effects of spring tides the succession of waves of which would damage the installation, it is convenient that, when the same is being established, the canalization is arranged as a covered one, e. g. as a tunnel, being provided with an inlet sluice which may be regulated, both to apportion the impetus of the tide, and to obturate completely the entrance of the channel which then is converted into a real break-water.

It is likewise convenient to guide the different directions of application of the pulsating current of waves, due to the winds prevailing in every season, for which purpose it suffices to branch off the channel outlet towards the open sea such as to form a kind of Y and to provide the one and the other branch with sluices, in order to be in a position to open in this way the inlet into the channel through the branch which faces the wind, closing the other branch, and if the direction be axial with respect to the channel, both the sluices will be opened.

Studying the formation of the surge or wave impulse on being lifted by the wind, we see that the first effect thereof when licking the liquid surface, is to drag along the molecules of the free surface which in turn draw along those that beneath are in contact with them, and so on successively, that is to say that, supposing direction or intensity of the wind were constant, finally is arrived at establishing a cycle in the distinct layers which will move with diminishing velocities from top to bottom. Consequently, what is convenient to be utilized principally is the motion of the upper layers as most rapid ones, restricting the depth of utilization to the indispensable minimum, whereby we will have increased the force of impulsion of the wheels in a considerable proportion, utilizing moreover in its maximum width the bed wherein the waves or undulations circulate, since any limitation in this sense would involve a resistance which would also subtract removal impulse from the intended canalized current.

From what is exposed above we deduce the necessity of the channel for mounting the mechanical means of avail, since in short, what is tried is to direct the resultant of a system of forces that actuate, once in longitudinal direction, others in transversal direction and others, finally, in that of depth, or vertically, and with said canalizations suitably arranged, the said resultant constitutes a force which, practically, may be considered in its maximum longitudinal intensity, if we succeed in reducing both the other, transversal and vertical components, to the minimum.

Now, the lower currents, although being of minor removal velocity than the superficial ones, when striking against a resisting surface which prevents the same from following on their advance, give rise to the motion of surf which brakes the removal of said superficial layers that, according to our convenience should run with their whole force through the channel, for which reason it is not convenient to us that said obstacle be massive, that is to say that the channel, or channels, have to be mounted upon a foundation which, when being immerged in the liquid mass, allows as far as possible the free passage of such lower layers, whereby the superficial ones will not be braked in their advance and will render the maximum circulatory efficiency which will be utilized by the series of the wheels which are spaced therein.

Thus, it results that the location of each channel with respect to the average level of the sea is perfectly defined, since we are in a position to calculate, in a general and approximative way, in 60 centimetres the distance between the immerged bottom thereof and that free surface of the before mentioned average level, and with respect to its width, the same will have to be the same as that of the driving wheels, with the indispensable play in order to avoid frictions thereof with vertical walls of the channel, thus being utilized in its maximum the width of the wave which circulates through the channel.

For the better understanding of what is hereinbefore exposed, a particular illustrative case of embodiment of the invention will now be described with reference to the accompanying two sheets of drawings, wherein:

Fig. 1 represents schematically a plan view of a system, or series of driving wheels, Fig. 2 being another schematical, vertical plan view of said series, without showing the transmitting means between wheels.

Fig. 3 represents, schematized, a section through the vertical axial plane of the lay-out of a channel with the foundation thereof.

Fig. 4 is a front view of said arrangement, and

Fig. 5 shows, likewise schematized, a plan view of the mechanical energy canalizing and transmitting system, the part of transformation into electrical energy thereof not being represented.

Figure 6:
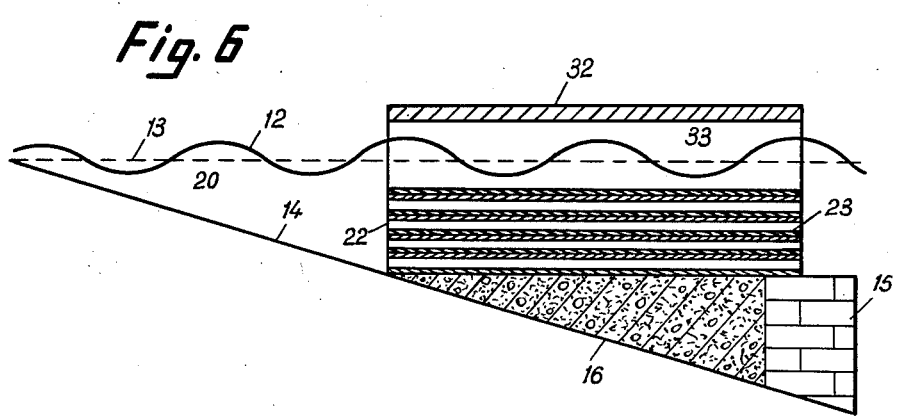
Fig. 6 is a diagrammatical longitudinal vertical section of the layout of a tunnel with the foundation thereof.
Figure 7:
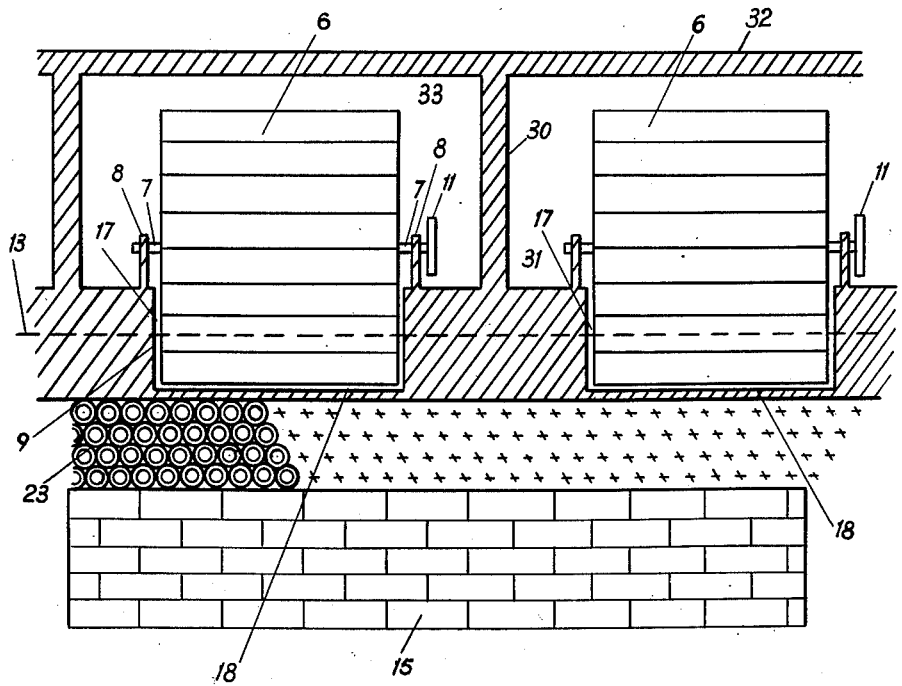
Fig. 7 is a front view of the arrangement of Fig. 6.

At 6, we schematize the driving wheels which, as may be seen, are arranged at irregular distances between each other, 7 being the respective axles with bearings 8 on the seats 9, and 10 denotes the linking means of wheels 6, on Fig. 1 being visible how any wheel which rotates due to the surge impulsion causes the whole series to rotate and, consequently, the wheel 11, coupled to the axle of one of the wheels, and how a wheel on being impelled in contrary direction becomes independent on its axle, resulting definitively that the whole system will rotate in the same direction and at the same speed and that, consequently, the wheel 11 will remain affected by said continuous rotation which, in virtue of any transmission means, for instance, a belt, will be imparted to the shaft of an electric generator, or any other energy transformer. In Fig. 2 we see how a part of each wheel penetrates under the surface of the water 12, the immersion depth of which has to be always sufficient to ensure the rotation of the wheel and therefor, in case that it may be question of a place where the tides are sensible, the diameter of wheel will have to be sufficient in order that always a greater or smaller segment thereof is covered.

In Fig. 3 we designate at 13 the dash line which indicates the average level of the waters at the point of location; at 14 we designate the assumed downward slope of the shore on which at the advanced end thereof within the sea there is constructed a contention wall 15 for the choking 16 which forms the sensibly horizontal channel, or channels, seat platform, properly speaking 17, the bottom 18 thereof being below the free surface of the sea, but at a scarce depth with respect to the same, viz. at 60 centimeters as above alluded to; said bottom 18 rests on a tubular system open at both ends in order to thus allow free passage to the currents of surge or sub-surface. In Fig. 4 is clearly seen the front part of said tubular system which with the advanced end thereof leans upon the contention wall 15 and the mass of the same rests on the choking 16, and with the same references of Fig. 3 are marked in this one the other elements of the ensemble, moreover being seen in this Fig. 4 the driving wheels located within the respective channels (in the figure we see only the front ends of each series) and said wheels linked together with those of each channel transmit the mechanical energy to the transforming machines which are in number and efficiency in relation with the potentiality of the circulatory current, according to agitation and direction of the surge or undulation.

In Fig. 5 is completed the illustration showing how is the canalizing installation, at 19 being indicated the terra firma, at 14 the shore, at 20 the portion of sea where the breakers of the pulsating current or undulation after running through the channels have to take place, at 21 the bridge or main pier which unites the terra firma with the jetty which sustains the channel or channels, at 22 the outlet of said canalizations, 23 being the respective inlets thereof; 24 designates the open sluice-gates and 25 the closed ones, and 26 are the small piers the walls of which form with the bottom the seat serving as a support for the bearings of the axles of the driving wheels series in each channel, said series being schematized in the drawing, as well as we indicate by means of dashes the mechanical connections of said wheels between one another thereof within each series, or channel, but the ones of one channel with independence of those of the others, in case that there were more than one; at 27 on the second small pier at the left hand side of the figure is marked the driving pulley with the sets of transmission thereof which are correlated with the generators imparting them the potential impulsion of the wheels of the first channel, and at 28 the same is denoted with respect to the second channel, of course, being necessary to couple a similar installation to each channel and, finally, are shown at the lower part of the drawing some series of parallel lines 29 of distinct inclinations which illustrate the waves or undulations attacking the jetty from different directions, resulting visible how is made possible, or hindered the entering thereof into the channels by means of the set of sluice-gates which may be opened, or closed, or reduce the inlet area in accordance with intensity and direction of the said agitations of the sea.

It may be desirable to have the channels 17 covered in order to give some effective protection for the mechanisms mounted therein against heavy waves or rainfall or wind. In this connection, vertically extending walls 30 are formed on the piers 26 intermediate the bearings 8, so that there is left room enough between the bearings and wall 30, as at 31, to allow comfortable passage of a person who is servicing or repairing the mechanisms. The walls 30 extend upwardly over the wheels and a flat concrete ceiling 32 is laid according to any conventional constructive procedure upon the edges of the walls and throughout the entire area of the ensemble thereby defining the tunnels 33 which completely enclose the wheels and the devices associated therewith.

We assume the sea where we establish the system of channels and driving wheels to be in the minimum of agitation, that is to say with the minimum available surge force, and then we measure the number of revolutions of the driving wheel of a series of wheels of a channel. It is obvious that said number will likewise be a minimum figure, but with a multiplying system we are in a position to transmit said force to an axle which may succeed e. g. in rotating at 400 revolutions per minute, said axle which we shall call gearing axle being connected to a change speed gear, for instance, provided with eleven speeds, so that the minor of them may correspond to the rotation of said 400 revolutions and every successive speed to an increase, in the present case, of 40 revolutions, that is to say that at the maximum speed will be duplicated that number, viz. 800 revolutions per minute.

Supposing the normal working of an electric generator be attained at said 800 revolutions, we only will have to measure the power of resistance inherent in the system, to link the mechanical system with the generator of capacity X which on absorbing the said potential will furnish us with a point of approximative reference for further applications correlated with the augmentation of force which the same may exert on the driving wheels at the progressive increase of the impulsion of the surge.

Thus, we set forth as a basis that in the moments of minimum utilization of the impulsion of the waves or undulations, the change speed gear being at its maximum, we operate a generator with an output which we shall name 100, as a reference for further calculations, and assuming for the purpose of our explanation the force of the sea to increase in a slow and progressive manner, we should note on measuring the number of revolutions that these would increase in relation with said force of the sea and, in case that said difference of impulsion would cause the revolutions to increase, for instance from 800 to 820, it would suffice to shift the change on to the immediately lower speed with respect to the initial maximum velocity in order that the axle would work at 780 revolutions; following on in this manner every time that the axle would arrive at the 820, and supposing always a progressively constant augmentation of the surge, we should arrive at having the change speed gear at its maximum speed and the generator would continue at the 800 revolutions which would be exactly the same as those of the gearing axle, whereby is demonstrated that the dragging force would have become duplicated, and in this moment it would be possible to add another generator of the same capacity as the first, shifting the change speed gear to its maximum speed; always considering the progressive increase of the force of the sea, we should arrive, following the same course hereinbefore described, at the fact that the gearing axle dragging the two generators would have the 800 revolutions, then being possible to perform new couplings of generators, but taking into consideration that the increase of produced power is in a direct relation with the resistance of dragging, this time said coupling will not be of 100 in addition to the already existing 100, but it will amount 200, since this is the real resistance which is growing increased; following on such course, a new augmentation will be of 400, the next one of 800, and so on, successively up to the limit which the installation may allow without danger.

If it would be question of diminishing velocity, would be operated in inverted sense, by reducing the productions in proportion with the generators which cease working, but always keep the same voltage the ones which may continue working.

The invention within its essentiality may be object of variations of details to which also extends the claimed protection; thus, the channels may be mounted on foundations which allow free passage of the lower currents in virtue of any suitable means, and the said channels may be covered or not, and with regard to the maintenance of the rotatory uniformity of the generators has to be taken into consideration that we have cited figures solely by way of enlightenment, but without that this, nor the cases of embodiment, hereinbefore detailed, would mean any limitation as to the essential bases of the invention which are comprehended within the scope of the following claims.

Having now described and ascertained the nature of my said invention and in what manner the same is to be performed, I declare that what I claim as new and desire to secure by Letters Patent is:

1. A system for producting energy by means of the force of the sea, comprising channels for the circulation therealong of the superficial sea waves or undulations, a foundation for said channels having lower sections which allow free passage to the sub-superficial sea currents thereby preventing formation of surf, a plurality of horizontal water driven mill wheels disposed within each channel for rotation in response to said superficial wave circulation, the longitudinal distance between the wheels of each of said channels being varied so that with a given undulatory uniformity of the sea surface there is always at least one wheel in operation, supporting axles for said wheels connected thereto so as to be driven by said wheels in one direction only, motion transmitting means correlating said axles to one another, energy transforming means and transmission means connecting said motion transmitting and energy transforming means to operate said energy transforming means in response to the rotation of said motion transmitting means.

2. A system for producing energy by means of the force of the sea, comprising tunnels for circulation therealong of the superficial sea waves or undulations, said tunnels being provided with regulating sluice gates at their outlets towards the sea, a foundation for said tunnels having lower sections which allow free passage to the sub-superficial sea currents thereby preventing formation of surf, a plurality of horizontal water driven mill wheels disposed within each tunnel for rotation in response to said superficial wave circulation, the longitudinal distance between the wheels of each of said tunnels being varied so that with a given undulatory uniformity of the sea surface there is always at least one wheel in operation, supporting axles for said wheels connected thereto, so as to be driven by said wheels in one direction only, motion transmitting means correlating said axles to one another, energy transforming means and transmission means connecting said motion transmitting and energy transforming means to operate said energy transforming means in response to rotation of said motion transmitting means.

3. A system for producing energy by means of the force of the sea, comprising channels for circulation therealong of the superficial sea waves or undulations, a foundation for said channels having lower sections which allow free passage to the sub-superficial sea currents thereby preventing formation of surf, a plurality of horizontal water driven mill wheels disposed within each channel for rotation in response to said superficial wave circulation, the longitudinal distance between the wheels of each of said channels being varied so that with a given uniformity of the sea surface there is always at least one wheel in operation, supporting axles for said wheels adapted to rotate and connected thereto so that said wheels drive said respective axles in one direction only, motion transmitting means correlating said axles to one another, energy transforming means and transmission means including a speed varying device connecting said motion transmitting and energy transforming means in response to the rotation of said motion transmitting means.

References Cited in the file of this patent

UNITED STATES PATENTS

| 726,733 | Nevins | Apr. 28, 1903 |
| 870,706 | Woodard | Nov. 12, 1907 |
| 958,467 | Bennett | May 17, 1910 |
| 1,333,443 | Reynolds | Mar. 9, 1920 |
| 2,566,447 | Griswold | Sept. 4, 1951 |

FOREIGN PATENTS

| 654,442 | France | of 1928 |